Feb. 20, 1923.
C. L. EMRY
RIM TOOL
Filed Oct. 17, 1919
1,445,825
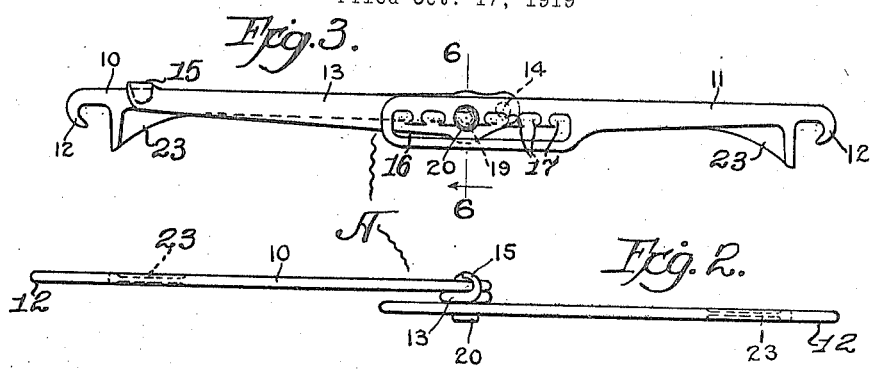
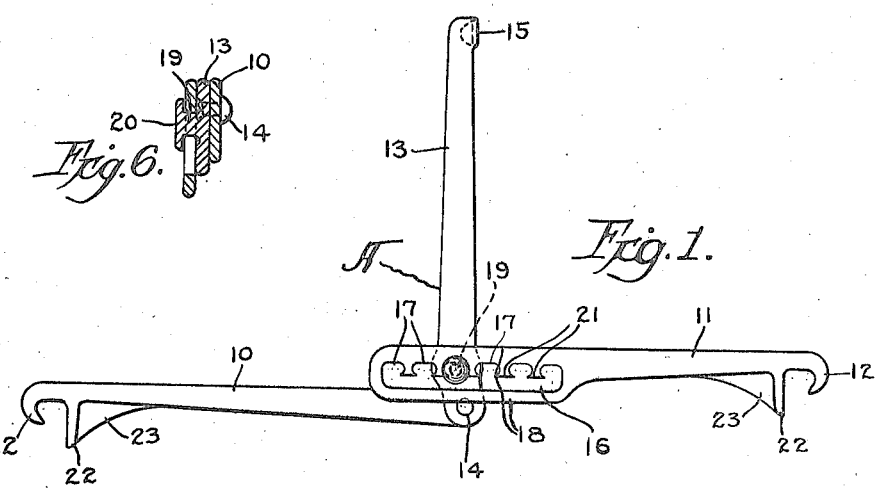
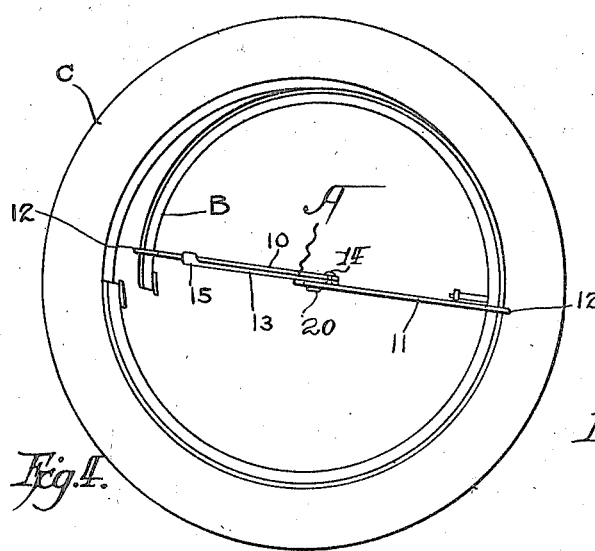
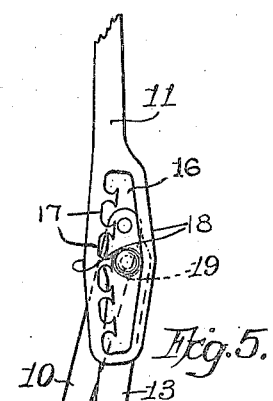
Inventor:
Clyde L. Emry,
by: Norau Fische,
Attorney.

Patented Feb. 20, 1923.

1,445,825

UNITED STATES PATENT OFFICE.

CLYDE L. EMRY, OF ST. PAUL, MINNESOTA.

RIM TOOL.

Application filed October 17, 1919. Serial No. 331,315.

*To all whom it may concern:*

Be it known that I, CLYDE L. EMRY, a citizen of the United States, residing at St. Paul, in the county of Ramsey and State of Minnesota, have invented a new and useful Improvement in Rim Tools, of which the following is a specification.

My invention relates to a rim tool which is particularly adapted for use in connection with split steel rims which are used for automobile pneumatic tires and the device is of a simple, inexpensive design, the elements of which are particularly adapted to be held collectively together and unseparable from each other so that they can be folded into a small, compact state.

The invention is provided with means for locking the elements in one position when the pivot points, which connect the same, are passed over their centers so as to firmly hold the device locked in a set position.

The device is provided with recesses which open into a slot so as to connect the recesses with the slot to adjustably position the elements of the device together, each recess being so formed as to lock a pin projecting from the operating lever so that the lever can be operated in either direction to move the elements of the device longitudinally to contract or expand a tire rim, as may be desired, when the pin is engaged in one of the notches.

A further important feature of the invention is in casting the notch engaging pin, which projects from the operating lever, integral with the operating lever and with a shoulder on its outer end which prevents the elements from being separated from the operating lever to hold the parts of the device collectively together. The slot formed in the element which carries the notches is formed open or bowed so as to receive the head or shoulder formed on the engaging pin of the operating lever, after which the element is squeezed together so as to cause the shoulder of the pin to engage the side of the element but to allow the pin to freely move in the slot to be adjusted into any of the notches.

The peculiar features of the construction, together with further objects, will be more fully described in the specification and claims.

In the drawings forming part of this specification:

Figure 1 is a side elevation of the rim tool in an open position.

Figure 2 is a plan view of Figure 1.

Figure 3 is a side elevation of the tool with the operating lever in closed and locking position, as it would appear when holding a tire rim contracted.

Figure 4 is a plan view of the rim tool engaging a tire rim, as it would appear when locked and holding the tire rim in contracted position.

Figure 5 illustrates a detail of the device, showing the open formation of the slot before the elements are connected together.

Figure 6 is a cross section on the line 6—6 of Figure 3.

In the drawing, the tire tool A is composed of rim engaging elements or arms 10 and 11, which are formed with hooks 12 on their free ends that are adapted to engage the split rim B of a tire C when it is desired to contract the rim to remove the tire C from the same.

An operating lever 13 is pivotally secured at 14 to the member 10 and is formed with a hook portion 15 on its outer free end, which is adapted to engage the arm 10 to limit the movement of the lever 13 in one direction.

The member 11 is formed enlarged on its inner end with a longitudinally extending slot or open portion 16, having a series of notches 17 which open into the slot 16. In the formation of the member 11, the slot 16 is formed with its sides 18 bowed outwardly, as illustrated in Figure 5.

An engaging pin 19 is formed integral with the operating lever 13 and projects from one side of the same near the pivot point 14, the pin 19 being adapted to engage in the slot 16 and notches 17. The pin 19 is formed with a shoulder or head portion 20 on its outer end, which is inserted in the opening or slot 16 when the sides 18 are bowed outwardly in connecting the member or element 11 with the operating arm 13 and the outwardly bowed sides 18 are then squeezed or forced inward to cause them to extend approximately parallel with the longitudinally extending edges 21 between the notches 17 so as to form a longitudinally equal width slot 16 on the inner end of the member 11, which is connected with the series of notches 17. When the bowed sides 18 are squeezed inward, the shoulder or head 20 of the pin 19 is adapted to hold or lock the member 11 connected with the operating arm 13 and member 10 against separation therefrom, thereby holding the members of the tool A collectively and unseparably together. The members 10, 11 and 13 are of a flat, thin nature and are preferably formed of malleable cast iron, the pin 19 with its head 20 being cast integral with the member 13, a feature which is very important. The pin 19 is freely slidable in the slot 16 so as to be adjusted into any of the notches 17. In this manner the spread of the operating arms 10 and 11 of the device A can be lengthened or shortened to adjust the same for different size rims, as the occasion offers.

The notches 17 are formed elongated so as to engage the pin 19 securely to allow the lever 13 to be moved in either direction to operate the arms or elements 10 and 11. Thus by operating the lever 13 the arms can be drawn together or forced apart when the pin 19 is engaging in one of the notches 17 without the pin 19 becoming disengaged from the notch in which it is positioned.

Shoulders 22 are formed integral with the members 10 and 11 and project from the body portion of the members, being positioned near the engaging ends or hooks 12, and a strengthening rib 23 is formed projecting from the body portion of the members 10 and 11 to brace and support the shoulders 22. The shoulders 22 are adapted to engage the inner portion of the split rim B to expand or close the rim by operating the lever 13 in the proper direction to move the members 10 and 11 longitudinally when the engaging pin 19 is set in the desired notch. The tire rim is freely and easily contracted by use of the tool A when the hooks 12 are brought into engagement with the rim B, and the lever 13 is moved into closed position, as illustrated in Figures 3 and 4. When the lever 13 is moved into this position the center of the pin 19 extends over the center of the pivoting point 14, thus locking the device A in contracted, closed position, while the hook 15, formed on the free end of the lever 13, is adapted to engage the member 10 and form a stop for the operating lever 13.

In a device of this kind it is very desirable that the members be connected together in a simple manner so as not to be separated from each other and still to be freely adjustable to various lengths for different size rims. My device is so constructed that it is very simple and inexpensive to manufacture, and while it is desirable to make it of malleable iron, it can be obviously constructed in any other suitable manner. It is an important feature that the member 11 be formed with bowed sides and an enlarged recess 16, which is later forced together so as to form a longitudinal equal slot 16 to hold the pin 19, the shoulder 20 of which prevents disengagement of the operating arm from the member 11 and by forming the pin 19, and shoulder 20 integral with the operating lever 13, a considerable expense in the manufacture of my device is eliminated, making a practical operative device. Further, the peculiar shape of the notches 17, which open into the slot 16 is important so as to hold or engage the pin 19 in either direction of the operation or movement of the operating lever 13. By passing the centers of the pivot points of the members over each other in contracting a rim, the members lock themselves together and this is a feature which is most desirable in a device of this nature.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. A rim tool comprising a pair of rim engaging members, a lever pivoted to one of said members, a lug formed on said lever and a plurality of C shaped slots formed on said other member adapted to be engaged by said lug to permit the lever to be manipulated in either direction.

2. A rim engaging tool comprising a pair of arms, means on said arms for engaging the inside of the rim, means on the arms for engaging the outside of the rim, a normally vertically positioned lever pivoted at its lower end to one of said arms, a slotted head formed on said second arm, a flanged lug formed integral with said lever shortly above the pivot to said arm adapted to operate in said slotted head and oppositely projecting pairs of hooks formed in said slot for engaging said lever in either direction of movement of the same.

3. A rim tool comprising a pair of rim engaging members, a lever pivoted to one of said members, a lug formed on the lever, a slot formed on the other member, a plurality of notches cooperating with said slot, said notches having oppositely facing socketed ends adapted to receive said lug in either direction of movement of said lever, and openings between said notches and said slots, said openings being of a width less than the width of said notches but sufficient to permit of said lug to pass downwardly through the same and into said slot.

CLYDE L. EMRY.